June 26, 1962    N. MILLER    3,040,374
SHRIMP PEELING, DEVEINING AND TAIL REMOVING MACHINE
Filed May 4, 1959    5 Sheets-Sheet 1

INVENTOR.
NIKOLI MILLER
BY
J.B. Feldman
ATTORNEY.

June 26, 1962 N. MILLER 3,040,374
SHRIMP PEELING, DEVEINING AND TAIL REMOVING MACHINE
Filed May 4, 1959 5 Sheets-Sheet 4

INVENTOR.
NIKOLI MILLER
BY
J.B. Felshin
ATTORNEY.

INVENTOR.
NIKOLI MILLER
BY
*J.B. Feldman*
ATTORNEY.

United States Patent Office 3,040,374
Patented June 26, 1962

3,040,374
SHRIMP PEELING, DEVEINING AND TAIL
REMOVING MACHINE
Nikoli Miller, 9101 E. Bay Harbor Drive,
Bay Harbor Islands, Miami Beach, Fla.
Filed May 4, 1959, Ser. No. 810,829
21 Claims. (Cl. 17—2)

This invention relates to a shrimp peeling, deveining and tail removing machine. The machine also embodies means for slitting the shrimp longitudinally, and means for removing the legs or feathers of the shrimp.

An object of this invention is to provide a highly improved machine of the character described, comprising means to feed forwardly a shrimp in its shell, but with the head cut off, head end forward, and with the tail projecting rearwardly and upwardly, means to devein the shrimp and peel the shell off the body of the shrimp, and means for thereafter turning over the shrimp upside down sideways through an angle of 180°, as it is fed forwardly, so that the tail will project downwardly instead of upwardly, and means to thereafter pull off the downwardly pointing tail.

Another object of this invention is to provide in a machine of the character described, travelling contacting belt runs for moving a shrimp gripped therebetween, in one direction, and said belt runs being twisted through an angle of 180° to turn the shrimp around upside down sideways to bring the upwardly pointing tail down to a downwardly pointing position, as the belt runs travel.

Still a further object of this invention is to provide in a machine of the character described, means to depress the tail end of a shrimp, while it is grippingly held between a pair of travelling belts, to swing the tail end of the shrimp downwardly, so that the tail may be received between a pair of rotating rollers for pulling off the tail as the shrimp continues to be fed forwardly by the moving belts.

Yet another object of this invention is to provide in a machine of the character described, a pair of belts, one within the other, with the longitudinal runs of the inside belt contacting the longitudinal runs of the outside belt, and portions of the belts at one side of said runs being turned inside out so that the contacting longitudinal runs of the belts become twisted 180°, the belts, adjacent one end, being separated so that a shrimp may be fed at said end between said belts to be moved by one pair of contacting belt runs, and said belt runs being separated at the opposite end to release the shrimp when it reaches said opposite end, and whereby the shrimp is turned around through an angle of 180° as it is moved by said belt runs.

Yet another object of this machine is to provide in a machine of the character described, highly improved means for feeding shrimp down between the belts.

Yet a further object of this invention is to provide in a machine of the character described, means to straighten out the shrimp as it passes between contacting runs of the belts.

A still further object of this invention is to provide in a machine of the character described, highly improved roller means disposed beneath a pair of adjacent belt runs and being inclined thereto for receiving the tail of a shrimp therebetween for removing the same from the shrimp.

Yet a further object of this invetnion is to provide a strong, rugged and durable machine of the character described, which shall be relatively inexpensive to manufacture, and which shall yet be sure and positive in operation and practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention.

Referring now in detail to the drawing, 10 designates a machine embodying the invention. Said machine comprises a stand or table 11. The same comprises a table top wall 12 supported on corner legs 13. Table top 12 has a rear end 12a, a front end 12b, a rear side 12c and a front side 12d. Legs 13 may support a shelf 15 disposed below the table top 12. The table top 12 is in the shape of an elongated rectangle and is formed with a central longitudinal slot 17, extending substantially the length of the table and centrally located with respect thereto. Supported on the shelf 15 is an electric motor M of any suitable type. The motor M (FIG. 12) is coupled by a coupling 20 to a drive shaft 21 journalled within a drive box or casing 22. On shaft 21 is a worm 23 meshing with a worm wheel 24 fixed on a transverse shaft 25 journalled in the drive box. On shaft 25 is a bevel gear 26 meshing with a bevel gear 27 on a vertical shaft 28, likewise journalled in the box 22. The bevel gear 26 also meshes with a bevel gear 29 on a horizontal longitudinal shaft 30. The shaft 30 passes through one end of the drive box, as at 32. Within the box there is fixed to the shaft 30 a bevel gear 33 meshing with a bevel gear 34 on a vertical shaft 35 also journalled in the box 22. The shafts 28 and 35 pass upwardly through suitable openings in the table top for the purpose hereinafter appearing.

Figures 12, 13:
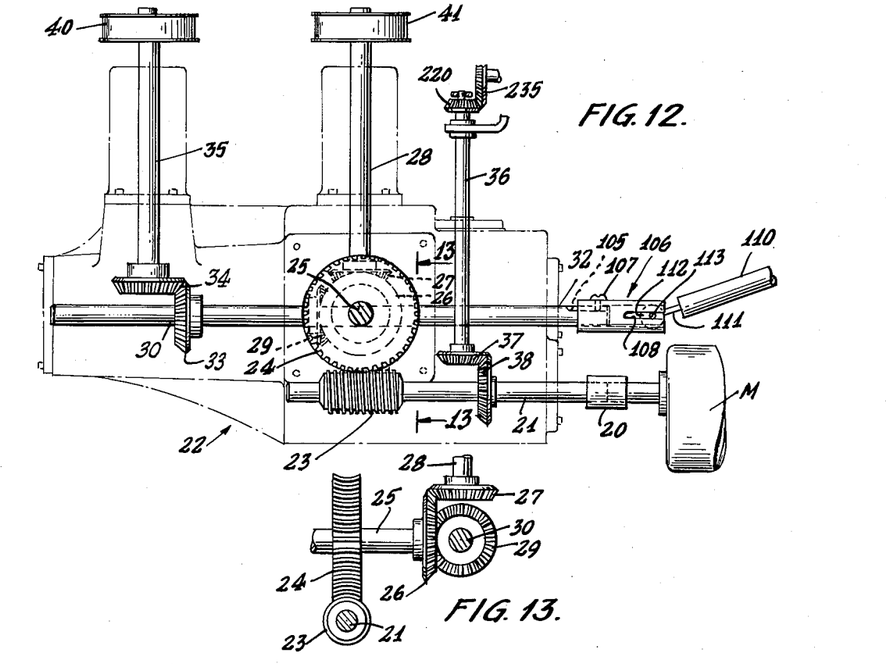
FIG. 12 is a longitudinal view of the drive mechanism.
FIG. 13 is a cross-sectional view taken on line 13—13 of FIG. 12.

Also within the drive box 22 is a vertical shaft 36 carrying at its lower end, a bevel gear 37 meshing with a bevel gear 38 on the drive shaft 21. The drive shaft 21, which is directly coupled to the motor, may rotate at 1800 r.p.m., but the speed of the shafts 28 and 35 is reduced to 60 r.p.m. The speed of the shaft 30 is also 60 r.p.m. The speed of the vertical shaft 36 may be reduced to 900 r.p.m.

Fixed to the upper ends of the shafts 35 and 28 are belt wheels 40 and 41, respectively, overlying table 12. These will rotate in the same direction at the same speed. It will be noted that the shafts 28 and 35 are in longitudinal alignment and are disposed near one end of the table 12 and on one side of the longitudinal slot 17.

Adjacent the opposite end of the table is a bracket 42 carrying a pair of vertical rollers 43 and 44. The bracket 42 may be adjusted since it is provided with a longitudinal slot 45 and is held down onto the table by a bolt 46 passing through the slot, and bolted or screwed to the table. It will be noted that the bracket 42 is located on one side of the longitudinal slot 17.

Mounted on said table, and on the other side of the slot 17, is a bracket 47 which is adjustable and carries a roller 48. The bracket 47 may be provided with a longitudinal slot 49 through which a bolt 50 passes, for attaching the bracket to the table top. Mounted on the table and engaging the drive wheels 40 and 41 and the rollers 43, 44 and 48, are a pair of belts 51 and 52. The belt 51, at the rear end 12a of the table, is inside of the belt 52 (FIG. 1, right end) and passes around the outside of roller 48. There is also attached to the top of the table 12 an adjustable bracket 53 carrying an idler roller or pin 54. The belt 52, at the adjacent end of the table, passes around the roller or pin 54 and around the outside of the roller 44 and in contact with the inside of the roller 43. The two belts 51 and 52, then contacting each other, being held in contact with each other by means of a pair of arms 55 and 56 pivoted to fixed vertical pins 55a and 56a. The arms 55, 56 are inclined toward each other and toward the rear end 12a of the table. These arms carry rollers 55b and 56b which engage the belts 51, 52 to press them together. The arms are pulled together by a coil tension spring 57 interconnecting said arms.

At the front end 12b of the table, the belt 51 is at the outside and the belt 52 is at the inside. This is accomplished by turning the portions of the belts 51, 52 together inside out. Before turning the belts, the belt 51, at the front end 12b extends further than the adjacent portion of belt 52 and is disposed above the belt 52. Then said portions of these belts 51, 52, at the front end 12b of the table, are turned inside out through an angle of 180° so that the belt 52 will be located inside of the belt 51 at said front end of the table, and is spaced therefrom, and the longitudinal runs of the belts at each side will be contacting and twisted 180°, as at 60 and 61. Thus, the twists 60 and 61 of the belts are accomplished by the use of endless belts, starting with untwisted belts. Belt 51 is first nested into the belt 52. All the rollers on the front end may be fitted with the belts individually. Then the belts at the opposite end are turned inside out so that the contacting portions of the belts are twisted sideways through 180° thereby creating the twisted portions 60, 61.

Hence, at the rear end, belt 52 is inside of belt 51, whereas at the front end belt 51 remains inside of belt 52. At the left end, the belt 52 passes around the outside of wheel 41, whereas the belt 51 passes around the outside of wheel 40.

Adjacent the rear side 12c of the table, the contacting runs of the belts may be pressed together by means of a pair of arms 64 and 65 pivoted to the table on fixed vertical pins 64a and 65a and carrying rollers 64b and 65b located on opposite sides of the belts. The arms are interconnected by a coil tension spring 66. Also fixed to the table, adjacent the rear side 12c, on a fixed vertical pin 67, is a roller 67a contacting the inner side of the belt 51 to tension the belts.

Adjacent the front end 12b of table top 12, is a fixed pin 68 on which is mounted an arm 69 carrying a roller 69a engaging the outside of the belt 51 to keep the belt in contact with the wheel 40. Also on a pin 70, fixed to the table, is an arm 71 carrying a roller 71a engaging the inside of the belt 51, to press a portion of the belt away from an adjacent portion of the belt 52 to form a separation or space between the belts and above the slot 17, so that the processed shrimp may drop down to a chute 73 to any suitable receptacle which receives the processed shrimp, as will appear hereinafter. The wheels 40 and 41 rotate in the direction shown in the arrows so that the runs of the belts which are over the slot 17 will move from right to left.

A shrimp may be fed to the space between belts 51, 52, at the rear end 12a of the machine by means of a hopper 75 mounted on any suitable bracket on the table top 12. This hopper has side walls 76, a front wall 77, rear wall 78 and a bottom wall 79. The bottom wall 79 is formed with an oval shaped opening 80. A nozzle 81, likewise of oval shape, extends downwardly from the bottom wall 79 to bring the shrimp, passed through the opening 80, down between the belts 51, 52, so that the shrimp will be moved to the left as it is carried between the contacting runs of the belts.

A back stop wall 82 may be fixed to the bottom wall 79 surrounding the opening 80 and extending upwardly therefrom. The shrimp used in this machine are shrimp that have their heads cut off, but which have not been deveined and have their shells and tails. The shrimp are fed downwardly, head end forward and tail end upwardly. Thus the sand vein of the shrimp is at the bottom of the shrimp body.

Figure 2:
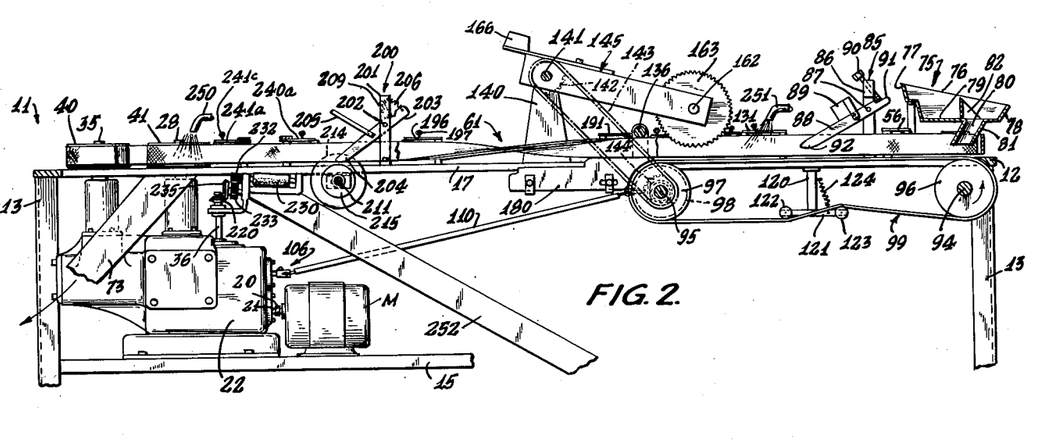
FIG. 2 is a cross-sectional view taken on line 2—2 of FIG. 1 and with only parts of the belts broken away.

Means is provided to straighten out or horizontalize the shrimp fed between the belts from the hopper. To this end there is mounted on the table top 12, just to the left of the hopper 75, as seen in FIGURE 2, a bracket 85 provided with a top cross-head 86. Fixed to the bracket 85, below the cross-head, is a pin 87. Pivoted to the pin 87 is a blade 88 inclined downwardly and forwardly (toward the front end 12b) of the table top. The lower end of the blade 88 is received between the belts. Mounted on the blade 88 is a counterweight 89. Screwed to the cross-head 85 is a screw 90 contacting the upper end 91 of the blade for adjusting the angle of the blade. As the shrimp moves forwardly, the lower end of the blade which is curved, as at 92, straightens out the shrimp so that the shrimp is substantially horizontal.

Figure 1:
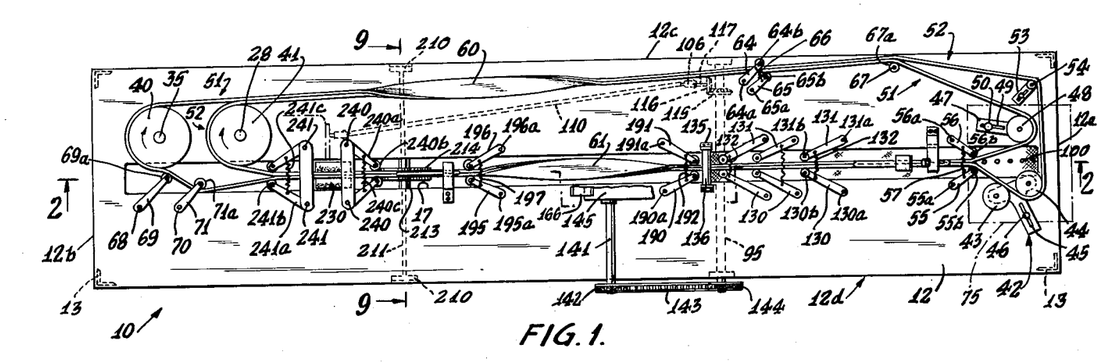
FIG. 1 is a top plan view of the machine embodying the invention, with parts removed and with the feeding trough removed but with its position relative to the machine shown in dot-dash lines.

Disposed below the table top 12 are a pair of spaced transverse horizontal shafts 94 and 95. On shaft 94 is a belt wheel or pulley 96. On shaft 95 is a belt wheel or pulley 97. The belt wheel 97 is formed with a central annular groove 98. Extending over the wheels 96, 97, is a bottom belt 99. The belt 99 may be formed with spaced central openings 100 (FIG. 1). The upper run of the belt 99 is located within the slot 17 and just below the lower edges of the contacting belts 51, 52. Thus the shrimp fed through the nozzle 81 passes between the belts 51, 52 and lays on the upper run of the belt 99.

Means is provided to drive shaft 95. To this end the shaft end 32 is formed with a longitudinal keyway or key slot 105 (see FIG. 12). Received on the shaft end 32 is a coupler sleeve 106 attached to the shaft end 32 by means of a set screw 107 projecting into the key slot 105. The sleeve 106 projects beyond the shaft end 32 and is formed with a pair of diametrically opposed, longitudinal slots 108 extending to the outer end of the coupler sleeve. Connected to the coupler sleeve 106 is an inclined connector shaft 110. Said shaft 110 at one end has a stem 111 carrying at its outer end a ball knob 112 received in the sleeve 106. Passing through the axis of the ball knob 112 is a transverse pin 113, the outer ends of which are received in the slots 108. The shaft 95 extends to the rear side 12c of the table and carries a bevel gear 115 meshing with a bevel gear 116 fixed to a suitably journalled shaft 117. On the shaft 117 is a coupler sleeve 106a, similar to the coupler sleeve 106 on shaft end 32. Shaft 117 is formed with a key slot 105a to receive a set screw 107a on this coupler sleeve 106a. At the opposite end of the connector shaft 110 is a stem 111a provided with a ball 112a received in the sleeve 106a and carrying a transverse pin 113a, the ends of which project into the slots 108a. There is thus provided a universal drive between the connector shaft 110 and the shafts 32 and 117. The shaft 110 inclines upwardly and rearwardly from the left to the right of the machine, as seen in FIGS. 1, 2 and 12 of the drawing.

Means is provided to tension the bottom belt 99. To this end there is fixed to the underside of the table a bracket 120, to the lower end of which is pivoted a cross-head 121. At the ends of the cross-head 121 are carried rollers 122 and 123. Roller 122 contacts the upper side of the belt 99, whereas roller 123 contacts the underside of the belt 99. The cross-head 121 is connected by a coil tension spring 124 to the bracket 120, thereby pressing the rollers 122 and 123 against spaced portions of opposite sides of the belt.

The belts 51, 52, after they pass the blade 88, are pressed together by three pairs of opposed pairs of arms 130 and 131, mounted on fixed pivots 130a and 131a and inclined toward the front end 12b and toward each other and carrying rollers 130b and 131b. The arms 130, 131, may be pulled toward each other by any suitable springs interconnecting said arms, such as spring 132. Rollers 130b, 131b, press the belts together.

Mounted on top of the table 12 is a bracket 135 carrying a horizontal pin or roller 136 engaging the upper edges of the belts 51, 52, as they pass beyond the three pairs of arms 130 and 131.

Means is provided, to remove the legs or feathers L from the shrimp S, as the shrimp passes beyond the blade 8. To this end there is mounted on the table top 12 a bracket 140 carrying a horizontal transverse shaft 141. On said shaft is a sprocket wheel 142 connected by a sprocket chain 143 to a sprocket wheel 144 on shaft 95.

Figure 7:
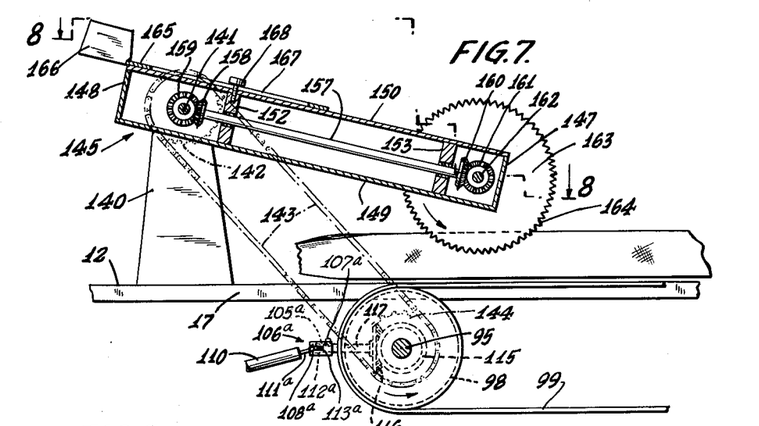
FIG. 7 is a vertical, cross-sectional view on an enlarged scale, through the drive mechanism for the shrimp leg removing mechanism.
Figure 8:
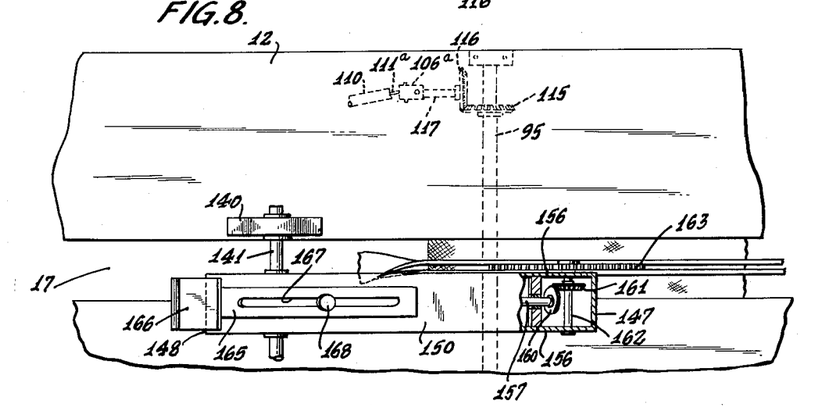
FIG. 8 is a cross-sectional view taken on line 8—8 of FIG. 7.

Pivoted to the shaft 141 (see FIG. 7) is a casing 145. Said casing 145 has side walls 156, end walls 147 and 148, and a bottom wall 149. It is also provided with a top cover 150. Said casing is provided with a pair of transverse partition walls 152 and 153 carrying bushings supporting a longitudinal inclined shaft 157. At one end of the shaft 157 is a bevel gear 158 meshing with a bevel gear 159 on the shaft 141. At the other end of the shaft 157 is a bevel gear 160 meshing with a bevel gear 161 on a shaft 162 carried by the casing. The shaft 162 is horizontal and carries a large wheel 163 having serrations or teeth 164 at its periphery. The lower end of the wheel 163 projects between the belts 51, 52, at a point somewhat to the rear of and above the shaft 95.

Fixed to the cover 150 is a slotted arm 165 carrying at its upper end a counterweight 166. Passing through a slot 167 in the arm 165 is a screw 168 for fixing the weighted arm in longitudinally adjusted position. It will be observed that the casing 145 can be pivotally raised for swinging movement about the axis of shaft 141. The wheel 163 is rotated in a counterclockwise direction, looking at FIG. 7 of the drawing, and removes the legs or feathers L of the shrimp S and at the same time it scores or weakens the shell of the shrimp.

Figures 3, 4, 5, 6, 6A:
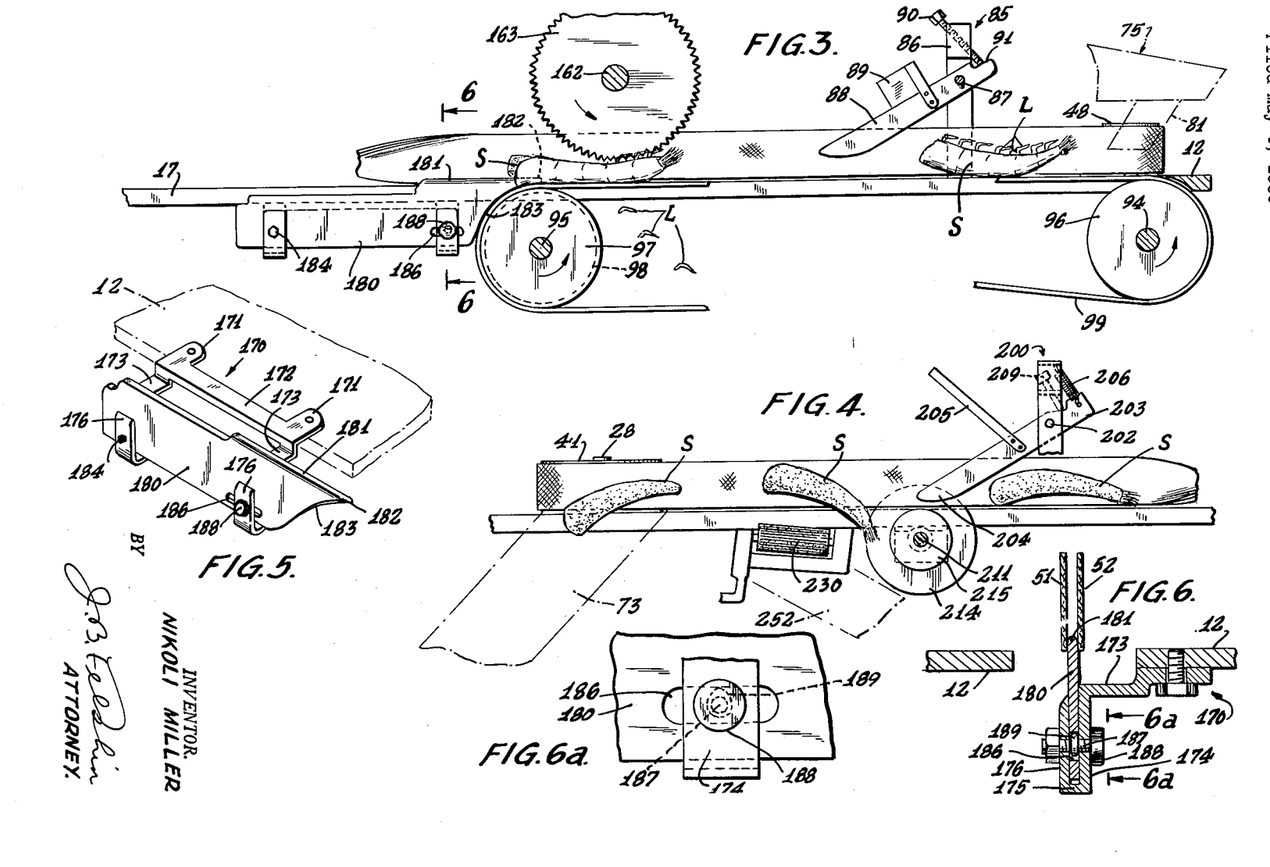
FIG. 3 is a partial, vertical, longitudinal view on an enlarged scale, illustrating the shrimp straightening mechanism, the leg removing mechanism and the deveining and peeling mechanism.
FIG. 4 is a partial, vertical, longitudinal view on an enlarged scale, illustrating the mechanism for pushing down the tail end of the shrimp, and the rollers for detailing the shrimp.
FIG. 5 is a perspective view of the deveining and peeling blade and bracket therefor.
FIG. 6 is a cross-sectional view on an enlarged scale, taken on line 6—6 of FIG. 3.
FIG. 6a is a view on an enlarged scale, taken on line 6a—6a of FIG. 6.

Means is provided to peel and devein the shrimp. To this end there is fixed to the underside of the table 12 a bracket 170 (see FIGS. 3, 5 and 6). Bracket 170 has portions 171 contacting and bolted or screwed to the underside of the table 12. Portions 171 are connected by a longitudinal portion 172. Extending from the end of portion 172 are arms 173 from which extend downwardly walls 174. Extending from walls 174 are bottom belt portions 175, from which extend upwardly fingers 176. Portions 174, 175, 176, are channels formed with slots in which is received the peeling and deveining tool 180. The tool 180 has an upper rounded longitudinal edge 181. It has a rearwardly pointed end 182. Extending from the point 182 is a forwardly and downwardly curved edge 183 conforming to and contacting the outer surface of the portion of the belt 99 which contacts the wheel 97. The upper edge portion 181 of the blade 180 is received between the adjacent runs of the belts 51, 52. The blade 180 is pivoted to the forward channel 174, 175, 176, by any suitable transverse stud 184. Said blade 180 is formed adjacent its front end with a longitudinal slot 186. Extending through the portions 174 and 176 of the rear channel is a stud 187, which may be turned by a wheel 188. On the stud is a cam 189 contacting the upper edge of the slot 186. Upon turning the wheel 188 the cam adjusts the level of the point 182. Very small adjustments are all that is necessary to conform to various size shrimp. As the shrimp is moved forward, head end first by the belts, the point 182 will enter the sand vein of the shrimp. As the belts move forwardly (to the left), the shell will enter between the blade 180 and the belt 99. As the shell is gripped between the curved edge 183 of the blade and the belt, the shell will be pulled downwardly around the belt to be deposited in any suitable chute. The groove 98 provides for yielding pressure to help remove the shell. Also, the openings 100 in the belt help to grip the shell and pull it down.

As the shrimp, which has now been deveined and shelled, passes the point 182 of the deveining tool, it will slide over the top edge of the deveining tool which helps also to clean out the sand vein. At this time the tail of the shrimp still points upwardly and rearwardly. However, the shrimp now moves through the twisted portion 61 of the belts 51, 52, and is turned around sideways through an angle of 180°. The tail of the shrimp still is then at the rear, but now it points downwardly. The head end of the shrimp is still forward.

At the rearward side of the twisted portion of the belts are another pair of arms 190 and 191 pivoted on pins 190a and 191a on opposite sides of slot 17, and carrying rollers pressed against opposite sides of the belt by an interconnecting coil tension spring 192. These rollers press the belts together before the twist starts. The top horizontal roller 136 is located between the arms 190 and 191 and the arms 130 and 131. The pin or roller 136, furthermore, is located forwardly of the leg removing wheel 163, as clearly seen in FIG. 2 of the drawing. The portion of the belts just beyond the twist 61 are pressed together by another set of arms 195, 196, pivoted on fixed vertical pins 195a, 196a, disposed on opposite sides of slot 17, and carrying rollers pressed against the opposite sides of the belts by an interconnecting tension spring 197.

Means is provided to turn the rear end of the shrimp about a horizontal axis whereby to press downwardly the tail end of the shrimp so that the tail will be disposed below the belts 51, 52. To this end there is fixed to the table top just forwardly of the arms 195, 196, a bracket 200 provided at the top with a horizontal cross-head 201. Fixed to the bracket 200, below the cross-head 201, is a pin 202. Pivoted to said pin is a blade 203 generally inclined downwardly and forwardly. The lower end of the blade is rounded, as at 204. Fixed to an intermediate portion of the blade, and inclined upwardly and forwardly, is a handle 205. A spring 206 interconnects the upper rear end of the blade with the cross-head 201 and tends to swing the lower end of the blade downwardly. An inclined screw 209, screwed to the cross-head, contacts the upper end of the blade to limit such rotary movement of the blade. By manipulating the handle 205, the lower end of the blade 204 may be lifted out from between the belts. It will be noted that where the blade 203 engages between the belts, the belt 52 is already at the inside and the belt 51 is at the outside.

Figure 9:
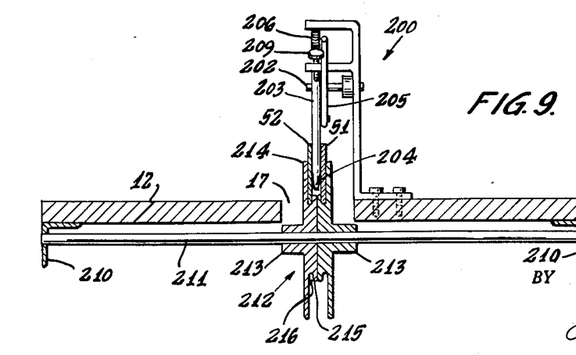
FIG. 9 is a cross-sectional view, with parts removed taken on line 9—9 of FIG. 1.

Mounted at the underside of the table 12 by means of a pair of brackets 210 (see FIG. 9) is a transverse horizontal shaft 211 located below the lower end 204 of the blade 203. Mounted on the shaft 211 are a pair of similar symmetrically disposed sheaves or disks 212. Each sheave or disk 212 has a central hub 213 through which the shaft 211 passes. The sheave 212 is formed with an annular disk portion 214 of larger diameter, and an inner disk portion 215 of smaller diameter, forming therebetween an annular groove 216 to receive the lower end of one of the belts 51, 52. Thus, one sheave engages the lower end of belt 51 whereas the other sheave engages the lower end of the other belt 52. The disks or sheaves 212 may move toward or away from each other as the shrimp passes between the belts past said sheaves. It will be noted that the front, head end of the shrimp is thicker than the rear tail end. Therefore, as the shrimp passes the lower end 204 of the blade 203 the front thicker end of the shrimp will not be depressed by the blade. However, when the lower end of the blade 204 presses downwardly on the rear tail end of the shrimp, the shrimp will be rotated in a clockwise direction, looking at FIGS. 2 and 4 of the drawing, about its thick end, to bring the tail of the shrimp downwardly below the belts.

Figure 10:
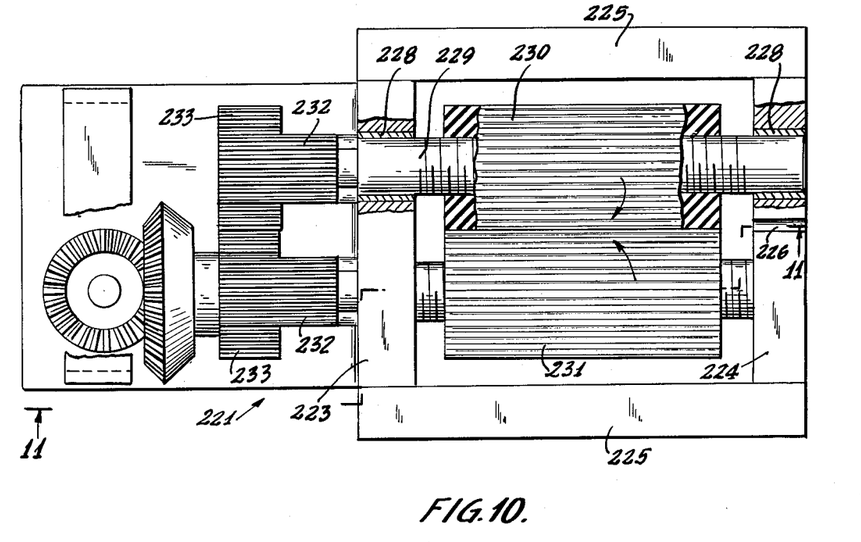
FIG. 10 is a top view with parts broken away, of the tail removing mechanism.
Figure 11:
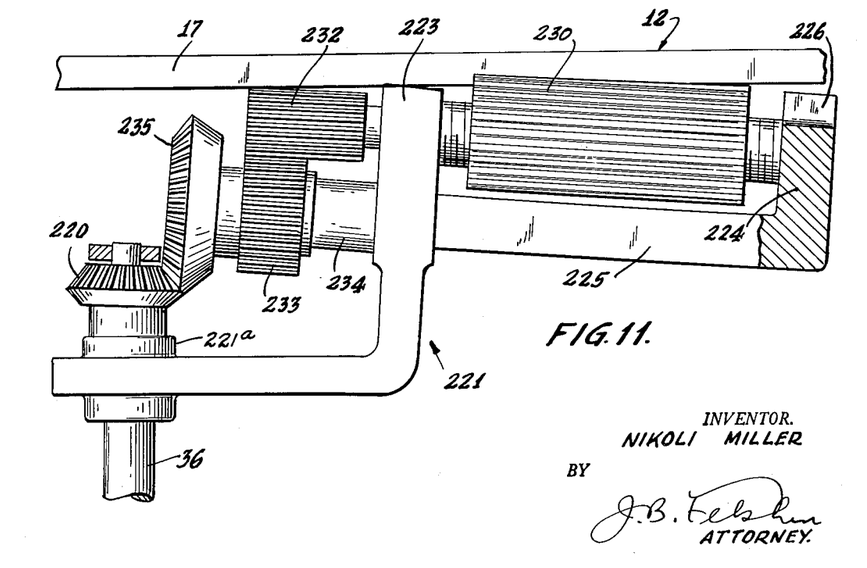
FIG. 11 is a cross-sectional view taken on line 11—11 of FIG. 10.

Means is provided to remove the tail of the shrimp after the peeling and deveining process is accomplished. To this end, there is attached to the upper end of the shaft 36 (FIG. 12) a bevel gear 220 located below the table 12. The shaft 36 is journalled in a bearing 221a on box or bracket 221 (see FIGS. 10 and 11). The bracket 221 comprises a pair of transverse parallel walls 223 and 224 interconnected by longitudinal side walls 225. The bracket 221 may be fixed to the underside of the table in any suitable manner. The wall 24 is formed in its upper edge with a central notch 226 curved outwardly and upwardly. Said transverse walls 223 and 224 carry bushings 228 supporting transverse shafts 229, carrying rubber or rubber-like rollers 230. The shafts 229, and hence the rollers 230, are inclined downwardly and rearwardly about 5° to 10°. The outer surfaces of the rollers may be formed with spaced longitudinal grooves, as at 231. Fixed to the shafts 220 are pinions 232. The pinions 232 mesh with pinions 233, respectively, mounted on suitable shafts 234 supported by the transverse wall 223. The pinions 233 mesh with each other. On shaft 234 is a bevel gear 235 meshing with the bevel gear 220. Thus, the rollers 230 roll inwardly toward each other and are inclined downwardly and rearwardly, and project upwardly somewhat into the slot 17 of the table 12. The bracket 221 is located forwardly of the shaft 211. As the tail of the shrimp moves through the notch 226 and between the rollers 230, the rollers will snip off the tail from the body of the shrimp. The shrimp with tail off is carried further by the belts 51, 52.

Means is provided to press the belts tightly together forwardly and rearwardly of the rollers 230. To this end there is fixed to the table top 12, at opposite sides of the rollers 230, a pair of pins 240 and 241. Pivoted to the pins 240 are rearwardly and inwardly extending arms 240a carrying rollers 240b and interconnected by a coil tension spring 240c. Pivoted to the pins 241 are forwardly and inwardly extending arms 241a carrying rollers 241b and interconnected by a coil tension spring 241c. When the deveined, shelled and de-tailed shrimp reaches the separation between the belts 51, 52, which is just beyond the rollers 241b, the shrimp will fall down to the chute 73.

Water may be supplied by any suitable water supply means, as by pipes 250 to a point above the space through which the shrimp drop to the chute 73. Water may also be supplied by means of a pipe or pipes 251 to a point above the belts 51, 52, just rearwardly of the leg removing wheel 163, as shown in FIG. 2 of the drawing. A chute 252 may extend from a point below the rollers 230 to carry away the tails to any suitable receptacle. Also, any suitable chute may be provided to remove the shells and the cleaned-out portions of the sand veins.

Figure 14:
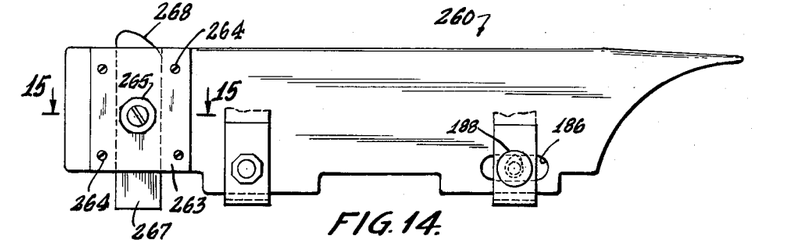
FIG. 14 is a side, elevational view of a peeling and deveining blade embodying a modified construction, including means for slitting the shrimp longitudinally.
Figure 15:
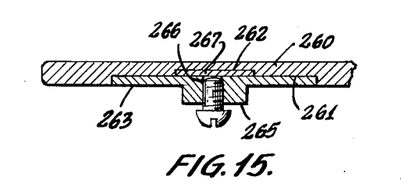
FIG. 15 is a cross-sectional view on an enlarged scale, taken on line 15—15 of FIG. 14.

In FIGS. 14 and 15, there is shown a blade 260 embodying a modification of blade 180. The blade 260 may replace the blade 180, if it is desired to slit the shrimp longitudinally. The blade 260 is similar to the blade 180 and is similarly mounted on the machine. However, the blade 260 is formed adjacent its rear end and on one side thereof, with a vertical wide shallow groove or slot 261, and with a vertical narrow slot 262 extending from the slot 261 and centralized with respect thereto. Received within the slot 261 is a plate 263 fixed to the blade 260 by four-corner screws 264. Fixed to the center of the plate 263 is a nut 265. The plate 263 is formed with an opening 266 registering with the threaded opening of the nut 265. Slidable within the vertical slot 261 is a blade 267 having a curved knife edge 268 at its upper end. As the deveined and shelled shrimp slides over the top edge of the blade 260 it is moved past the cutting edge 268 of the knife blade and is slit longitudinally.

It will thus be seen that there is provided an apparatus in which the several objects of this invention are achieved and which is well adapted to meet the condition of practical use.

As possible embodiments might be made of the above invention, and as various changes might be made in the embodiments above set forth, it is to be understood that all matter herein set forth or shown in the accompanying drawings is to be interpreted as illustrative and not in a limiting sense.

I claim:

1. In combination, a support, means on said support for moving forwardly a shrimp, head end foremost and tail inclined upwardly and rearwardly, and a pointed tool on said support and in the path of the shrimp, fixed in position for the point of the tool to enter the sand vein of the shrimp to clean out the sand vein as the shrimp is moved forwardly, said shrimp moving means including means which moves sideways upside down through an angle of 180° to turn the shrimp around sideways upside down through an angle of 180° as it is moved forwardly, said turning means being located to turn the shrimp beyond said tool, so that the tail inclines downwardly and rearwardly, and means on the support and below said shrimp moving means, for removing the tail of the shrimp after the shrimp has been turned around by said turning means.

2. In combination, a support, means on said support to move a shrimp with its head off and shell on, forwardly, head end foremost and tail end at the rear inclined upwardly and rearwardly, means on said support and adjacent said moving means, to devein the shrimp and peel the shell from the shrimp as it is moved forwardly, said moving means including means beyond the deveining means, which moves sideways upside down through an angle of 180°, to turn the shrimp around sideways 180° upside down so that the rear tail inclines downwardly, as the shrimp continues to be moved forwardly, and means on the support and below the moving means, to remove the downwardly inclined tail as the shrimp continues to be moved forwardly, and after it has been turned around.

3. The combination of claim 2, in combination with means on the support to swing the rear end of the downwardly inclined tail of the shrimp downwardly about an axis transverse to the shrimp, after the shrimp has been turned around and before the tail of the shrimp has been removed by the tail removing means.

4. In combination, a pair of belts having contacting runs, the contacting runs of the belts having portions which are twisted 180°, means to move said runs of the belts in the same direction for moving shrimp fed between said contacting runs, head end foremost and tail end rearward and projecting upwardly, whereby the shrimp carried forwardly by the belts are turned around sideways 180° by the twisted portions of the belts as the shrimp are carried by the twisted portions of the belts, so that the upwardly pointed tails will point downwardly after it passes the twisted portion of the belts, means located in advance of the twisted portions of said runs of said belts, to devein the shrimp and to peel the shrimp, and means located beyond the twisted portions, and below said belts, to remove the tail of the shrimp after the shrimp has been turned around by the wisted portions of said runs of the belts.

5. The combination of claim 4, in combination with means located in advance of the tail removing means and between said runs of the belts, to swing the rear tail end of the shrimp downwardly so that the tail of the shrimp projects below the belts.

6. In combination, a horizontal elongated table provided with a longitudinal slot, a pair of belts on top of the table, means on the table to support the belts, opposite runs of one belt being in contact with opposite runs of the other belt, at least one pair of contacting runs being twisted 180°, and shrimp deveining and peeling means on the table and located on one side of the twisted portions of said belts and means located at the other side of the twisted portions of said belts, to remove the tails of the shrimp.

7. In combination, a table, means on the table to move a beheaded shrimp with the shell on, forwardly, with the head end of the shrimp extending forwardly and the tail end of the shrimp at the rear projecting upwardly, means on the table to devein the shrimp and peel the shell of the shrimp as said shrimp is moved forwardly, said moving means including means to turn the deveined and peeled shrimp sideways, around through an angle of 180°, so that the tail of the shrimp will project rearwardly and downwardly instead of rearwardly and upwardly, after the shrimp has been deveined and peeled, and means on the table and located in position to act on the shrimp after it has been turned around, to pull off the tail of the shrimp.

8. The combination of claim 7, in combination with means on the table to remove the legs of the moving shrimp prior to deveining and peeling the shrimp, and at the same time to score the shrimp shell along the legs to weaken the shell.

9. In combination, a table, a pair of belt wheels mounted for rotation at one end of the table on vertical, longitudinally aligned shafts, a pair of belts contacting said wheels, means at the other end of the table to engage said belts, one of said belts having a pair of opposite runs contacting a pair of opposite runs of the other belt, said contacting runs of said belts being twisted 180° so that one belt is at the outside of the other belt at one end of the table, and inside of the other belt at the other end of the table, means at the other end of the table, to feed shrimp between said belts at said other end so that said shrimp are moved by the belts toward the first end of the table, a pair of horizontal shafts below the table, pulleys on said horizontal shafts, a bottom belt on said pulleys, the upper run of the bottom belt being located beneath the lower edges of one pair of contacting runs of the first two belts, a deveining blade fixed to the table and having a rearwardly extending point and a curved edge contacting a portion of the bottom belt which passes around one of the pulleys, said blade being located in one direction relative to the twist in said one pair of contacting runs of the belts, and a pair of contacting longitudinal rollers mounted on the table, below the lower edges of said one pair of contacting runs of the belt and located in the opposite direction relative to said twist, and means for rotating said rollers inwardly toward each other.

10. The combination of claim 9, in combination with a bracket on the table, a blade pivoted to the bracket and inclined forwardly and downwardly and projecting between said belts in advance of said pair of longitudinal rollers.

11. The combination of claim 10, in combination with a transverse shaft mounted beneath the table and a pair of sheaves slidably mounted on said transverse shaft and having annular grooves receiving lower edges of said pair of runs of said belts, respectively.

12. In combination, a table, a shelf beneath the table, an electric motor on said shelf, a drive box on said shelf, a drive shaft journalled in the drive box, means to connect the motor to the drive shaft, a worm on the drive shaft, a shaft journalled in the drive box above the drive shaft and transversely thereof, a worm wheel on said transverse shelf meshing with the worm, a bevel gear on said transverse shaft, a shaft journalled in the box parallel to the drive shaft, a bevel gear on said parallel shaft meshing with the bevel gear on the transverse shaft, a first vertical shaft journalled in said box, a bevel gear on the vertical shaft meshing with the bevel gear on the transverse shaft, a second bevel gear on said parallel shaft, a second vertical shaft journalled in said box, a bevel gear on the second vertical shaft meshing with the second bevel gear on said parallel shaft, said vertical shafts passing upwardly through openings in one end of the table, belt wheels on the upper ends of the vertical shafts and disposed above the table, belts engaging said belt wheels, roller means at the other end of the table to engage, each belt having opposite longitudinal runs in contact with opposite longitudinal runs of the other belt, said longitudinal contacting runs being twisted 180° so that the belt which is outside of the other belt at one end of the table, is inside of the other belt at the other end of the table, a pair of parallel transverse shafts beneath the table, pulleys on said transverse shafts, a bottom belt on said pulleys, the upper run of the bottom belt being disposed beneath a pair of contacting runs of the pair of belts on the table, and drive means including a universal drive means, connecting the parallel shaft with one of said parallel transverse shafts, shrimp deveining means on the table, at one end of the twist in one pair of said contacting runs, and shrimp tail removing means on said table, at the other end of said twist.

13. The combination of claim 12, another vertical shaft journalled in the box and carrying a bevel gear, a bevel gear on the drive shaft meshing with the last mentioned bevel gear, a pair of rollers disposed beneath the table and in contact with one another, and means driven by said last mentioned vertical shaft to rotate said rollers inwardly toward each other, said rollers being located beneath said contacting runs of said pair of belts and being located in one direction relative to the twist in said runs, and said bottom belt being located beneath said contacting runs of the pair of belts in the opposite direction relative to the twist.

14. A table, a pair of belts on the top of the table, each belt having a pair of opposite longitudinal runs contacting the opposite longitudinal runs of the other belt, said opposite longitudinal runs of said belts being twisted 180°, means to keep one belt in spaced relation to the other belt at the ends of said longitudinal runs, means on the table to drive said belts, a pair of rollers on the table located beneath and extending longitudinally of a pair of contacting runs of the belt, and means to rotate said rollers, shrimp deveining means on the table, at one end of the twist in one pair of said contacting runs, and shrimp tail removing means on said table, at the other end of said twist.

15. The combination of claim 14, said rollers being located beyond one end of the twist in said contacting runs of the belts, a pair of parallel horizontally aligned shafts beneath the table, pulleys on said transverse shafts, a bottom belt on said pulleys, the upper run of the bottom belt being located beneath said contacting runs of the belt and beyond the opposite end of said twist, and a blade fixed to the table and having a point projecting rearwardly, and having a curved portion contacting the portion of the bottom belt engaging the more forward of said pulleys.

16. The combination of claim 15, in combination with hopper means on the table to feed shrimp between said belts above the more rearward end of the bottom belt and between said pair of belts.

17. The combination of claim 16, in combination with a bracket mounted on the table forwardly of the hopper means, and a blade pivoted to the bracket, said blade being inclined downwardly and forwardly and projecting between the contacting runs of said pair of belts.

18. The combination of claim 17, in combination with a bracket mounted on a table in advance of said pair of rollers, a second blade pivoted to the last mentioned bracket and projecting between the contacting runs of said pair of belts.

19. In combination, a table provided with a longitudinal slot, a pair of belts having longitudinal runs, portions of which are disposed in vertical planes and contacting one another, means to move said runs of said belts longitudinally in the same direction, said runs of said belts being disposed above said longitudinal slot and extending longitudinally thereof, a bracket attached to the table and disposed therebeneath, a pair of longitudinal coextensive rollers rotatably mounted on said bracket and contacting one another in the plane of contact of said runs, means to rotate said rollers concurrently at the same rate of speed inwardly toward each other, said rollers being made of rubber-like material and having longitudinal grooves and means to press said runs together at opposite ends of said rollers.

20. The combination of claim 19, said rollers being inclined upwardly in the direction of movement of said longitudinal runs of said pair of belts.

21. The combination of claim 20, and a bracket mounted on the table in advance of the rollers and a blade pivoted to the bracket and being inclined downwardly and forwardly and passing between said pair of belts.

References Cited in the file of this patent

UNITED STATES PATENTS

| | | |
|---|---|---|
| 313,064 | Eddy et al. | Mar. 3, 1885 |
| 1,997,360 | Crozier | Apr. 9, 1935 |
| 2,659,930 | Jagger | Nov. 24, 1953 |
| 2,699,030 | Adamson | Jan. 11, 1955 |
| 2,760,225 | Miller | Aug. 28, 1956 |
| 2,767,539 | Huddle | Oct. 23, 1956 |
| 2,884,657 | Miller | May 5, 1959 |